United States Patent
Chen et al.

(10) Patent No.: US 11,243,805 B2
(45) Date of Patent: Feb. 8, 2022

(54) JOB DISTRIBUTION WITHIN A GRID ENVIRONMENT USING CLUSTERS OF EXECUTION HOSTS

(71) Applicant: International Business Machines Corporation, Armonk, NY (US)

(72) Inventors: Chong Chen, Richmond Hill (CA); Fang Liu, Beijing (CN); Qi Wang, Markham (CA); Shutao Yuan, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 16/363,503

(22) Filed: Mar. 25, 2019

(65) Prior Publication Data

US 2019/0220309 A1 Jul. 18, 2019

Related U.S. Application Data

(63) Continuation of application No. 15/262,580, filed on Sep. 12, 2016, now Pat. No. 10,268,509, which is a continuation of application No. 13/528,571, filed on Jun. 20, 2012, now Pat. No. 9,477,529.

(51) Int. Cl.
*G06F 9/48* (2006.01)
*G06F 9/50* (2006.01)
*H04L 29/08* (2006.01)

(52) U.S. Cl.
CPC ............ *G06F 9/4881* (2013.01); *G06F 9/505* (2013.01); *G06F 9/5038* (2013.01); *G06F 9/5044* (2013.01); *G06F 9/5061* (2013.01); *G06F 9/5072* (2013.01); *H04L 67/1002* (2013.01);

(Continued)

(58) Field of Classification Search
None
See application file for complete search history.

(56) References Cited

U.S. PATENT DOCUMENTS

| | | |
|---|---|---|
| 5,881,284 A | 3/1999 | Kubo |
| 6,088,727 A | 7/2000 | Hosokawa et al. |
| 7,093,004 B2 | 8/2006 | Bernardin |

(Continued)

OTHER PUBLICATIONS

GridWay Project Leads; GridWay—Configuration Guide 5.6 (gridway.org/doku.php?id=documentation:release_5.6:cg#resource_prioritization_policies); Apr. 9, 2012.

(Continued)

*Primary Examiner* — Abu Zar Ghaffari
(74) *Attorney, Agent, or Firm* — Kulsoom Z. Hasan

(57) ABSTRACT

A technique for job distribution within a grid environment includes receiving jobs at a submission cluster for distribution of the jobs to at least one of a plurality of execution clusters where each execution cluster includes one or more execution hosts. Resource attributes are determined corresponding to each execution host of the execution clusters. Resource requirements are determined for the job and candidate execution clusters are identified for processing the job based on the resource attributes of the execution hosts and the resource requirements of the job. An optimum execution cluster is selected from the candidate execution clusters for allocating the job thereto for execution of the job based on a weighting factor applied to select resources of the respective execution clusters.

18 Claims, 8 Drawing Sheets

(52) U.S. Cl.
CPC ............... *G06F 2209/505* (2013.01); *G06F 2209/5012* (2013.01)

(56) References Cited

U.S. PATENT DOCUMENTS

| | | |
|---|---|---|
| 7,243,145 B1 | 7/2007 | Poortman |
| 7,428,542 B1 | 9/2008 | Fink et al. |
| 7,464,378 B1* | 12/2008 | Limaye ............... G06F 9/5061 714/100 |
| 7,502,850 B2 | 3/2009 | Fellenstein et al. |
| 7,509,671 B1 | 3/2009 | Bedell et al. |
| 7,596,788 B1 | 9/2009 | Shpigelman |
| 7,644,408 B2 | 1/2010 | Kroening |
| 7,689,694 B2 | 3/2010 | Kato et al. |
| 7,712,100 B2 | 5/2010 | Fellenstein |
| 7,739,470 B1 | 6/2010 | Norgren |
| 7,784,056 B2 | 8/2010 | Berstis |
| 7,797,705 B2 | 9/2010 | Oka |
| 7,818,150 B2 | 10/2010 | Barnett et al. |
| 7,844,969 B2 | 11/2010 | Bigagli et al. |
| 7,861,246 B2* | 12/2010 | Lu ............... G06F 9/5072 718/102 |
| 7,900,206 B1 | 3/2011 | Joshi et al. |
| 7,991,753 B2 | 8/2011 | Rao |
| 8,015,235 B1 | 9/2011 | Bauer et al. |
| 8,205,208 B2 | 6/2012 | Mausolf et al. |
| 8,250,131 B1* | 8/2012 | Pulsipher ............... G06F 9/5072 709/201 |
| 8,260,840 B1* | 9/2012 | Sirota ............... G06F 9/5061 709/201 |
| 8,296,419 B1 | 10/2012 | Khanna et al. |
| 8,321,558 B1 | 11/2012 | Sirota et al. |
| 8,365,181 B2 | 1/2013 | Flower |
| 8,412,822 B1 | 4/2013 | Weinman, Jr. |
| 8,606,749 B1 | 12/2013 | Brown et al. |
| 8,843,929 B1 | 9/2014 | Oppenheimer et al. |
| 8,886,744 B1* | 11/2014 | Pabla ............... G06F 9/505 709/217 |
| 8,930,946 B1* | 1/2015 | Hyman ............... G06F 9/5038 718/1 |
| 9,026,658 B2* | 5/2015 | Xu ............... G06F 9/5072 709/226 |
| 9,183,058 B2* | 11/2015 | Li ............... G06F 9/5066 |
| 9,262,216 B2* | 2/2016 | Bodik ............... G06F 9/4887 |
| 9,465,663 B2 | 10/2016 | Mincarelli |
| 9,477,529 B2 | 10/2016 | Chen |
| 9,590,849 B2 | 3/2017 | Shakirzyanov et al. |
| 9,594,599 B1 | 3/2017 | Johnson |
| 10,108,452 B2 | 10/2018 | Chen |
| 10,268,509 B2 | 4/2019 | Chen |
| 10,275,277 B2 | 4/2019 | Chen |
| 10,664,308 B2 | 5/2020 | Chen |
| 2001/0039581 A1 | 11/2001 | Deng et al. |
| 2002/0041395 A1 | 4/2002 | Kimura |
| 2002/0116437 A1 | 8/2002 | Kambara et al. |
| 2004/0044718 A1 | 3/2004 | Ferstl |
| 2004/0215590 A1* | 10/2004 | Kroening ............... G06F 9/5072 |
| 2005/0050544 A1 | 3/2005 | Saito et al. |
| 2005/0071843 A1 | 3/2005 | Guo et al. |
| 2005/0108394 A1 | 5/2005 | Braun et al. |
| 2005/0154625 A1 | 7/2005 | Chua et al. |
| 2005/0160133 A1 | 7/2005 | Greenlee et al. |
| 2005/0198104 A1* | 9/2005 | Kwon ............... G06F 9/5072 709/200 |
| 2005/0283782 A1* | 12/2005 | Lu ............... G06F 9/5072 718/100 |
| 2006/0010449 A1 | 1/2006 | Flower et al. |
| 2006/0048157 A1 | 3/2006 | Dawson et al. |
| 2006/0149842 A1* | 7/2006 | Dawson ............... G06F 9/5072 709/226 |
| 2006/0179143 A1 | 8/2006 | Walker et al. |
| 2006/0212740 A1 | 9/2006 | Jackson |
| 2007/0025272 A1 | 2/2007 | Niu et al. |
| 2007/0094662 A1 | 4/2007 | Berstis et al. |
| 2007/0174346 A1 | 7/2007 | Brown et al. |
| 2007/0271570 A1 | 11/2007 | Brown |
| 2008/0052712 A1 | 2/2008 | Gustafson et al. |
| 2008/0103861 A1 | 5/2008 | Zhong |
| 2008/0168436 A1 | 7/2008 | Shwartz et al. |
| 2008/0209428 A1 | 8/2008 | Baryshnikov et al. |
| 2008/0209434 A1* | 8/2008 | Queck ............... G06F 9/5044 718/105 |
| 2009/0049448 A1* | 2/2009 | Dawson ............... G06F 9/5072 718/104 |
| 2009/0083390 A1 | 3/2009 | Abu-Ghazaleh et al. |
| 2009/0089300 A1 | 4/2009 | Vicente |
| 2009/0113434 A1 | 4/2009 | Podila |
| 2009/0164635 A1 | 6/2009 | Denker et al. |
| 2010/0070740 A1 | 3/2010 | Allen et al. |
| 2010/0146515 A1 | 6/2010 | Shpigelman |
| 2010/0211954 A1 | 8/2010 | Bauer et al. |
| 2010/0223618 A1* | 9/2010 | Fu ............... G06F 9/505 718/102 |
| 2011/0078303 A1* | 3/2011 | Li ............... H04L 67/1012 709/224 |
| 2011/0161483 A1 | 6/2011 | Takemura |
| 2011/0173626 A1* | 7/2011 | Chi ............... G06F 9/5072 718/103 |
| 2011/0231280 A1 | 9/2011 | Farah |
| 2011/0295999 A1* | 12/2011 | Ferris ............... G06F 9/5072 709/224 |
| 2011/0307899 A1 | 12/2011 | Lee et al. |
| 2012/0030683 A1* | 2/2012 | Kurdi ............... G06F 9/5072 718/104 |
| 2012/0059639 A1 | 3/2012 | Fung et al. |
| 2012/0131591 A1* | 5/2012 | Moorthi ............... H04L 67/10 718/104 |
| 2012/0137002 A1* | 5/2012 | Ferris ............... G06F 9/5072 709/226 |
| 2012/0278812 A1* | 11/2012 | Wang ............... G06F 9/505 718/104 |
| 2013/0007753 A1* | 1/2013 | Jain ............... G06F 9/46 718/103 |
| 2013/0055262 A1 | 2/2013 | Lubsey et al. |
| 2013/0073552 A1 | 3/2013 | Rangwala et al. |
| 2013/0212279 A1 | 8/2013 | Dutta et al. |
| 2013/0262556 A1 | 10/2013 | Xu et al. |
| 2013/0326064 A1 | 12/2013 | Gulati |
| 2019/0042309 A1 | 2/2019 | Chen |
| 2019/0220310 A1 | 7/2019 | Chen |

OTHER PUBLICATIONS

Adaptive Computing Enterprises, Inc.; Moab Workload Manager—Administrator Guide; pp. 1-1354; 2011.

Ding, Zhaohui et al.; Implement the Grid Workflow Scheduling for Data Intensive Applications with CSF4; Fourth IEEE International Conference on eScience; 2008; pp. 563-569.

Bose, Abhijit et al.; MARS: A Metascheduler for Distributed Resources in Campus Grids; Proceedings of the Fifth IEEE/ACM International Workshop on Grid Computing (GRID '04); 2004; pp. 1-9.

* cited by examiner

JOB DISTRIBUTION WITHIN A GRID ENVIRONMENT USING CLUSTERS OF EXECUTION HOSTS

BACKGROUND

The increasing complexity of electronic tasks, often referred to as "jobs" (e.g. executable programs such as computational tasks, command execution, data collection, etc.) has increased the demand for resources used in accomplishing such tasks. Resources may include hardware that aids in completing electronic tasks, such as servers, clients, mainframe computers, networks, network storage, databases, memory, CPU time, etc. Resources may also include software, available network services, software licenses, and other non-hardware resources. One response to the increased demand for resources has been the development of networked computing grid systems, which operate to integrate resources from otherwise independent grid participants. Computing grid systems generally include hardware and software infrastructure configured to form a virtual organization comprised of multiple resources in often geographically disperse locations. Electronic tasks typically require certain amounts and/or types of resources for completion. Once a job is created, it needs to be assigned, or scheduled, to sufficient and compatible resources within a computing grid system for processing. For example, some resources may be ranked for determining which resource(s) should be used for processing submitted jobs, such as forecasting resource utilization based on historical statistics, runtime cluster loads, etc. Jobs may also be assigned to certain resources based on availability of data or applications needed to process the job.

BRIEF SUMMARY

According to one aspect of the present disclosure a method, system, computer program product, and technique for job distribution within a grid environment is disclosed. In one aspect, a method includes receiving jobs at a submission cluster for distribution of the jobs to at least one of a plurality of execution clusters where each execution cluster includes one or more execution hosts. Resource attributes are determined corresponding to each execution host of the execution clusters. Resource requirements are determined for the job and candidate execution clusters are identified for processing the job based on the resource attributes of the execution hosts and the resource requirements of the job. An optimum execution cluster is selected from the candidate execution clusters for allocating the job thereto for execution of the job based on a weighting factor applied to select resources of the respective execution clusters.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
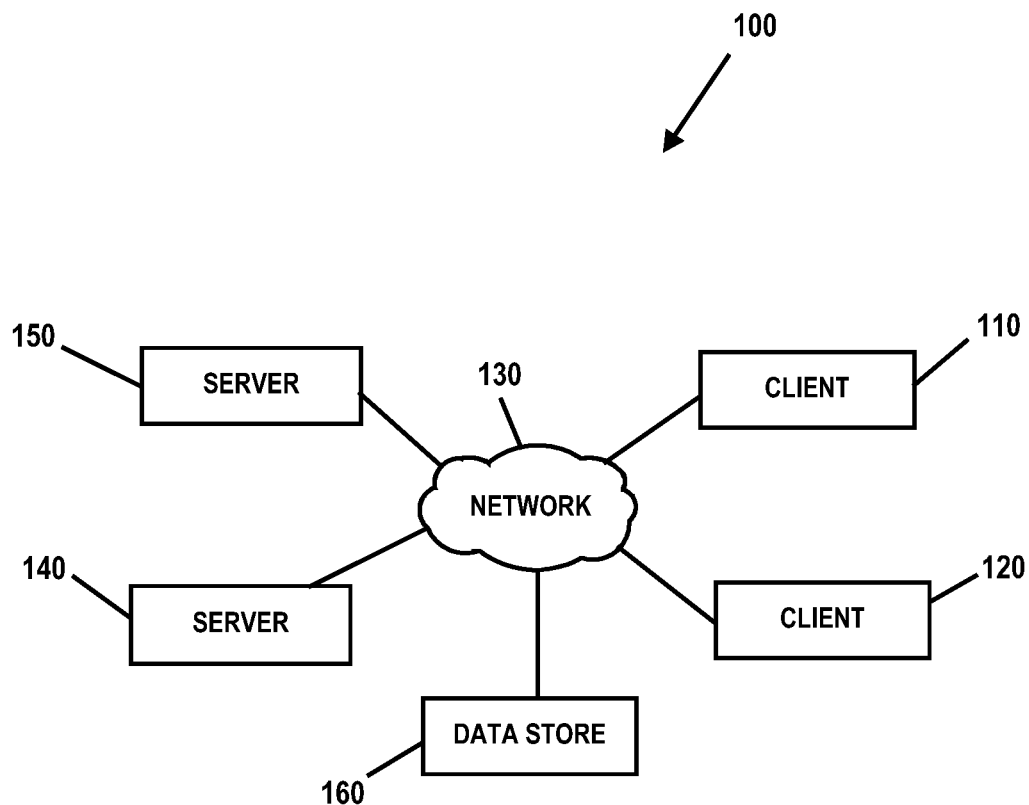
FIG. 1 is an embodiment of a network of data processing systems in which the illustrative embodiments of the present disclosure may be implemented.

Embodiments of the present disclosure provide a method, system and computer program product for job distribution within a grid environment. For example, in some embodiments, the method and technique includes: receiving jobs at a submission cluster for distribution of the jobs to at least one of a plurality of execution clusters, each execution cluster comprising one or more execution hosts; determining resource attributes corresponding to each execution host of the execution clusters; grouping, for each execution cluster, execution hosts based on the resource attributes of the respective execution hosts; defining, for each grouping of execution hosts, a mega-host for the respective execution cluster, the mega-host for a respective execution cluster defining resource attributes based on the resource attributes of the respective grouped execution hosts; determining resource requirements for the jobs; and identifying candidate mega-hosts for the jobs based on the resource attributes of the respective mega-hosts and the resource requirements of the jobs. Thus, in some embodiments of the present disclosure, the resources of back-end execution hosts are grouped based on the same or similar resources to define mega-host resource definitions. A course granularity matching process is performed between the resource requirements of the submitted jobs and the resource definitions of the mega-hosts to quickly identify candidate mega-hosts (and thus corresponding execution clusters) for job processing. Further, embodiments of the present disclosure group the submitted jobs according to the resource requirements of the jobs, and the users or user groups submitting the jobs, to efficiently schedule groups of jobs to the back-end execution clusters. Additionally, various resource utilization and job forwarding techniques are utilized, such as fair-share policies regarding resource utilization (including a dynamic priority for users/user groups), a dynamic pending job queue length for execution clusters, a forwarding resource ratio for various resources of the execution clusters (which may be applied on a resource-specific basis, applied to all resources of a particular type, applied to particular execution clusters, applied to all execution clusters, etc.) and/or a cluster selection process that considers host-based resources and shared resources, including a weighting factor that may be applied to the various resources, to efficiently select the optimum execution cluster for job processing.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
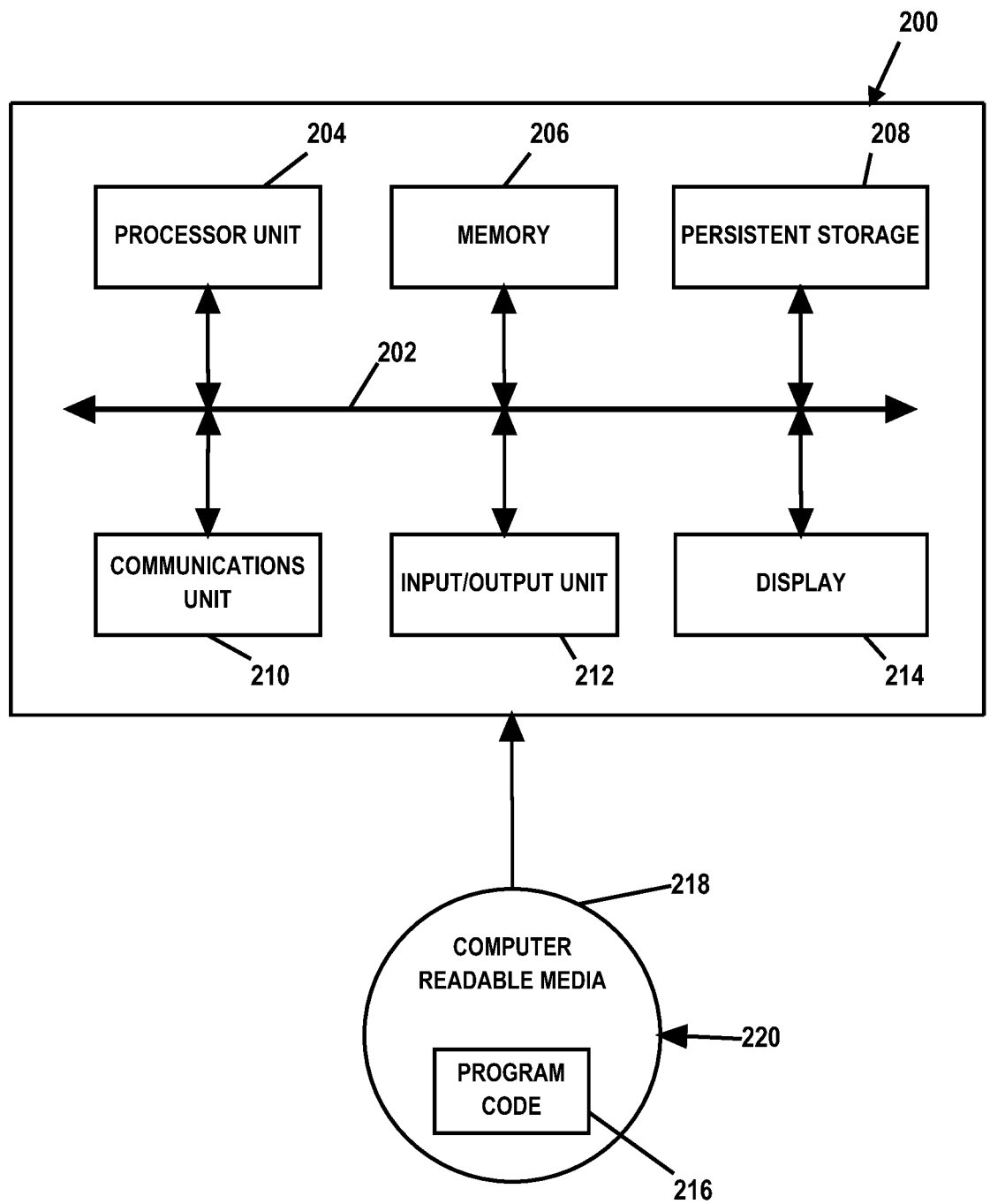
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for job distribution within a grid environment according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
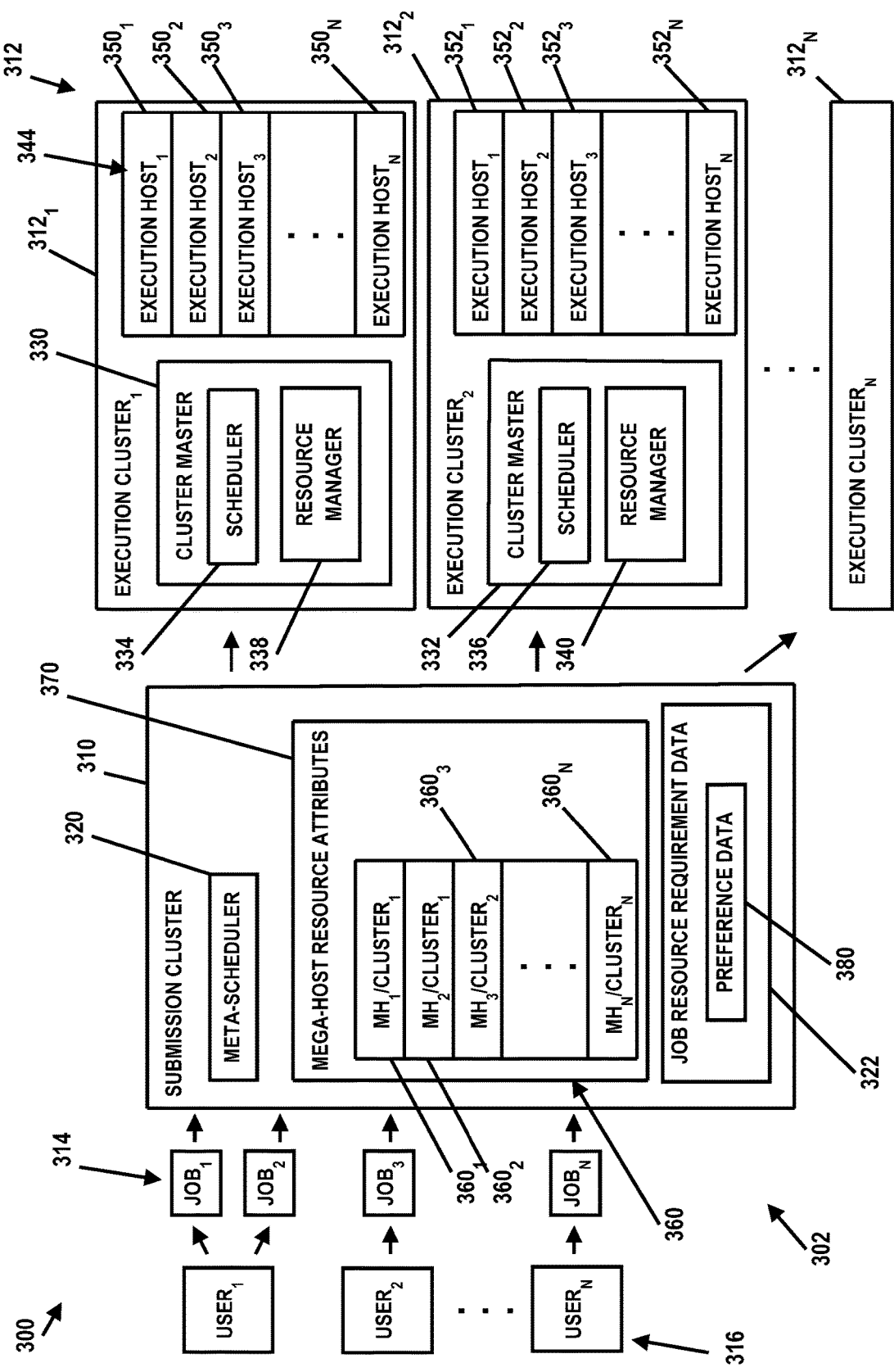
FIG. 3 is a diagram illustrating an embodiment of a data processing system for job distribution within a grid environment in which illustrative embodiments of the present disclosure may be implemented.

FIG. 3 is an illustrative embodiment of a system 300 for job distribution within a grid environment. Various components of system 300 may be implemented on data processing systems or platforms such as, but not limited to, servers 140 and/or 150, clients 110 and/or 120, or at other data processing system locations. In FIG. 3, system 300 illustrates an exemplary grid architecture 302 where a plurality of clusters are configured to communicate with one another and/or share resources across the grid. Each cluster may include a plurality of linked machines or "hosts" which are configured to provide resources such as CPU time, database storage, software licenses, and computing capabilities. A host may be any machine capable of providing resources, such as a personal computer (PC), a server, or other type of computing device. Resources on a particular host may be divided into "slots" which generally refer to certain amounts of electronic task or job capacity on the host.

In the embodiment illustrated in FIG. 3, system 300 includes a submission cluster 310 and one or more execution clusters 312 (e.g., execution clusters $312_1$-$312_n$). Submission cluster 310 may comprise a single host or multiple hosts and is configured to receive jobs 314 (e.g., $job_1$-$job_n$) from one or more clients or users 316 (e.g., $user_1$-$user_n$). In some embodiments, submission cluster 310 is configured to support a large scale cluster or grid environment while providing single system images to users 316. Submission cluster 310 receives jobs 314 from users 316, analyzes the resource requirements of the submitted jobs 314, and performs various scheduling decisions to schedule and/or forward jobs 314 to back-end execution clusters 312 for execution/processing. For example, in the embodiment illustrated in FIG. 3, submission cluster 310 includes a meta-scheduler 320 and job resource requirement data 322. Resource requirement data 322 may comprise information regarding the resource requirements for particular jobs 314. For example, each job 314 may require certain resources (e.g., a certain number of servers, particular operating system, certain licensed software applications, memory capacity, particular processor or CPU capabilities, require a certain number of job slots, project name, etc.). Meta-scheduler 320 performs various resource matching evaluations based on the resource requirements of the different jobs 314 and the cluster resource attributes and availability to process the jobs 314 (e.g., the resource attributes and availability of execution clusters 312). It should be understood that in some embodiments, submission cluster 310 may hold a certain number of pending jobs 314 and may include a local scheduler for processing a certain number of jobs 314 using local submission cluster 310 resources while other jobs are forwarded to execution clusters 312 for processing. Meta-scheduler 320 may be implemented in any suitable manner using known techniques that may be hardware-based, software-based, or some combination of both. For example, meta-scheduler 320 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 3, each execution cluster 312 includes a cluster master 330 and 332 having a respective scheduler 334 and 336 and resource manager 338 and 340. For ease and clarity description, various components and functions described in connection with execution clusters $312_1$ and $312_2$ may not be described and/or illustrated with respect to execution cluster $312_n$; however, it should be understood that additional execution clusters 312 may include similar components and/or functionality. Each cluster master 330 and 332 may comprise a master host associated with the respective execution cluster $312_1$ and $312_2$ configured with various administration and/or management functions corresponding to the respective execution cluster $312_1$ and $312_2$. For example, each scheduler 334 and 336 may perform local scheduling functions for jobs 314 received by the respective execution cluster $312_1$ and $312_2$ from submission cluster 310. Resource managers 338 and 340 may gather and/or otherwise collect resource attribute information corresponding to each host of the respective execution cluster $312_1$ and $312_2$. Schedulers 334 and 336 and/or resource managers 338 and 340 may be implemented in any suitable manner using known techniques that may be hardware-based, software-based, or some combination of both. For example, schedulers 334 and 336 and/or resource managers 338 and 340 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

As described above, each execution cluster 312 includes one or more execution hosts 344 each with various resource attributes (e.g., host type, host model, slots, maximum memory capacity, maximum swap, NCPU, host level Boolean resources, etc.). Resource managers 338 and 340 may collect and/or otherwise gather resource attribute information associated with the various execution hosts 344 of the respective execution cluster $312_1$ and $312_2$ and provide the resource attribute information to submission cluster 310 (e.g., to meta-scheduler 320). For example, in the illustrated embodiment, execution cluster $312_1$ includes execution hosts $350_1$-$350_n$, and execution cluster $312_2$ includes execution hosts $352_1$-$352_n$. Some of execution hosts $350_1$-$350_n$ may include the same or similar resource attributes (or resource attributes falling within some defined range or resource category), and some of execution hosts $352_1$-$352_n$ may include the same or similar resource attributes (or resource attributes falling within some defined range or resource category). Meta-scheduler 320 groups, sorts and/or otherwise combines execution hosts 344 having the same or similar resource attributes or resource attributes meeting some defined criteria for each respective execution cluster 312 and defines and/or models one or more mega-hosts 360 for each execution cluster 312. For example, in the embodiment illustrated in FIG. 3, submission cluster 310 includes mega-host resource attribute data 370 comprising information corresponding to each mega-host $360_1$-$360_n$ defined for a respective execution cluster 312. In FIG. 3, a mega-host $360_1$ is defined for execution cluster $312_1$, a mega-host $360_2$ is also defined for execution cluster $312_1$, a mega-host $360_3$ is defined for execution cluster $312_2$, etc. Each mega-host $360_1$ and $360_2$ (and any other mega-hosts 360 defined for execution cluster $312_1$) may define a different set of resource attributes corresponding to a particular set or grouping of execution hosts 344 of execution cluster $312_1$ (e.g., one or more of execution hosts $350_1$-$350_n$). Similarly, mega-host $360_3$ (and any other mega-hosts 360 defined for execution cluster $312_2$) defines a different set of resource attributes corresponding to a particular set or grouping of execution hosts 344 of execution cluster $312_2$. The defined criteria for determining mega-host 360 groupings may vary (e.g., based on slots, memory capacity attributes, host-based resource attributes, shared resources, or other types of resource attributes) such that execution hosts 344 meeting the mega-host criteria or having resource attributes defined in the mega-host criteria are included in the respective mega-host 360.

As a further example, consider the following simplified resource attributes corresponding to various execution hosts 344 of execution cluster $312_1$:

$EH350_1$: 4 slots, 16G memory capacity
$EH350_2$: 4 slots, 16G memory capacity
$EH350_3$: 4 slots, 16G memory capacity
$EH350_4$: 4 slots, 32G memory capacity
$EH350_5$: 4 slots, 32G memory capacity where $EH350_1$-$EH350_5$ represent five different execution hosts 344 within execution cluster $312_1$, execution hosts $EH350_1$-$EH350_3$ each contain four slots with a sixteen gigabyte maximum memory capacity, and execution hosts $EH350_4$-$EH350_5$ each contain four slots with a thirty-two gigabyte maximum memory capacity. Further, consider the following simplified resource attributes corresponding to various execution hosts 344 of execution cluster $312_2$:

$EH352_1$: 8 slots, 64G memory capacity
$EH352_2$: 8 slots, 64G memory capacity
$EH352_3$: 8 slots, 64G memory capacity
$EH352_4$: 8 slots, 64G memory capacity
$EH352_5$: 8 slots, 64G memory capacity where $EH352_1$-$EH352_5$ represent five different execution hosts 344 within execution cluster $312_2$, and each of execution hosts $EH352_1$-$EH352_5$ contains eight slots with a sixty-four gigabyte maximum memory capacity. Meta-scheduler 320 groups, for each execution cluster 312, execution hosts 344 with the same or similar key resource attributes. Thus, in this example, meta-scheduler 320 may define the following mega-hosts 360:

$MH360_1$ ($MH_1$/$Cluster_1$): 12 slots, 16G memory capacity
$MH360_2$ ($MH_2$/$Cluster_1$): 8 slots, 32G memory capacity
$MH360_3$ ($MH_3$/$Cluster_2$): 40 slots, 64G memory capacity
where $MH360_1$ and $MH360_2$ represent mega-hosts 360 for execution cluster $312_1$ defining a set of resource attributes corresponding to execution hosts 344 of execution cluster $312_1$ having the same or similar resource attributes. $MH360_3$ represents a mega-host 360 for execution cluster $312_2$ defining a set of resource attributes corresponding to execution hosts 344 of execution cluster $312_2$ having the same or similar resource attributes.

Accordingly, in operation, meta-scheduler 320 analyzes job resource requirement data 322 corresponding to received jobs 314 and performs a resource matching evaluation to mega-host 360 resource attributes to identify candidate mega-hosts 360 (and thus corresponding execution clusters 312) for processing the received jobs 314. Thus, by performing a coarse granularity resource matching of job resource requirements to mega-host 360 resource attribute information, meta-scheduler 320 determines which execution clusters 312 have resources that will satisfy the job resource requirements without having to evaluate each execution host of each execution cluster. Using the above example, if a job $314_1$ has a resource requirement of a sixty-four gigabyte memory capacity, meta-scheduler 320 may compare the resource requirements against the resource attributes of each mega-host 360 and identify candidate mega-hosts 360 meeting the resource requirements of job $314_1$ (e.g., mega-host $360_3$ as a candidate mega-host 360 for job $314_1$ processing), and thereby identify candidate execution clusters 312 having the resources to satisfy the resource requirements of job $314_1$ (e.g., execution cluster $312_2$). Meta-scheduler 320 may also dynamically and automatically perform execution host 344 grouping, sorting and/or otherwise combining for defining and/or modeling one or more mega-hosts 360 for each execution cluster 312 based on changes in resource attributes of particular execution hosts 344 (e.g., if a new Boolean resource is set to a particular execution host 344 in a particular execution cluster 312, and the Boolean resource is part of the desired or predefined mega-host grouping criteria, meta-scheduler 320 may automatically remove the execution host 344 from an existing mega-host 360 that may not contain the Boolean resource and add or join the execution host 344 to another mega-host 360 that contains the Boolean resource).

Figure 4:
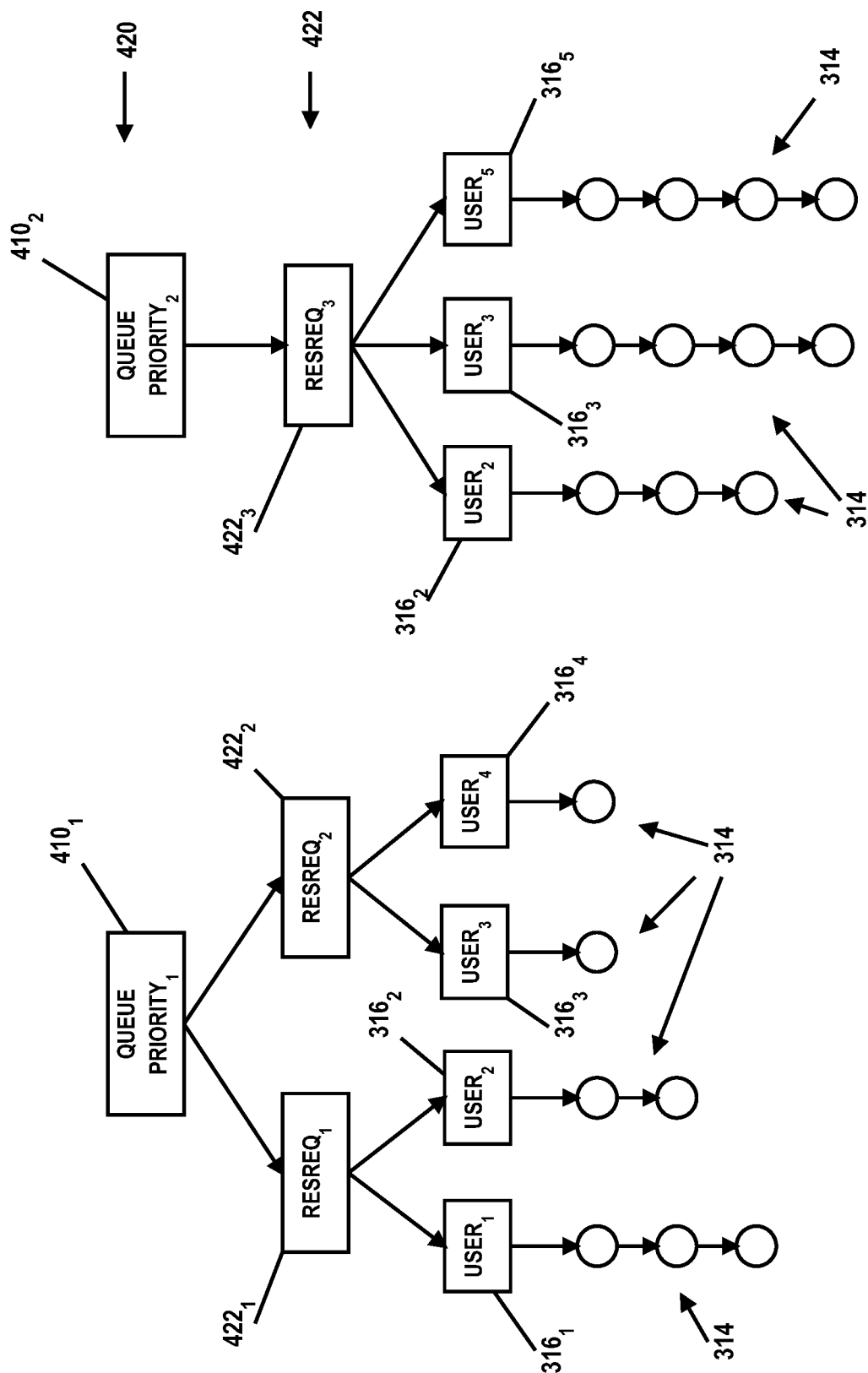
FIG. 4 is a diagram illustrating is a diagram illustrating a method and technique for job grouping and scheduling in a grid environment according to the present disclosure.

FIG. 4 is a diagram illustrating a method and technique for job grouping and scheduling in a grid environment according to the present disclosure. In the illustrated embodiment, meta-scheduler 320 groups, organizes and/or otherwise sorts jobs 314 based on various policies as well as the resource requirements of the respective jobs. For example, in the illustrated embodiment, meta-scheduler 320 organizes jobs 320 based on priority policies into one or more priority queues 410. In FIG. 4, two priority queues $410_1$ and $410_2$ are illustrated; however, it should be understood that the quantity of queues 410 may vary based on a quantity of different queue levels or priorities (e.g., each level or queue associated with a different priority of job processing). In the illustrated embodiment, queue $410_1$ may be considered a high priority queue 410 while queue $410_2$ may be considered a low priority queue 410. Each job 314 may define a priority level as well as the resource attributes needed to satisfy the respective job 314. Meta-scheduler 320 organizes and/or sorts the jobs 314 into resource requirements "buckets" or groups based on the same or similar job resource requirements. In FIG. 4, three different levels and/or categories of job resource requirement groups 422 are illustrated (e.g., identified as $RESREQ_1$ $422_1$, $RESREQ_2$ $422_2$ and $RESREQ_3$ $422_3$). In FIG. 4, jobs 314 are further organized, sorted and/or grouped based on a particular user 316 submitting the job 314. In the illustrated embodiment, $user_1$ $316_1$ has three submitted jobs 314 with $RESREQ_1$ $422_1$ resource requirements, $user_2$ $316_2$ has two submitted jobs 314 with $RESREQ_1$ $422_1$ resource requirements, $user_3$ $316_3$ has one submitted job 314 with $RESREQ_2$ $422_2$ resource requirements, and $user_4$ $316_4$ has one submitted job 314 with $RESREQ_2$ $422_2$ resource requirements. Additionally, $user_2$ $316_2$ has three submitted jobs 314 with $RESREQ_3$ $422_3$ resource requirements, $user_3$ $316_3$ has four submitted jobs 314 with $RESREQ_3$ $422_3$ resource requirements, and a $user_5$ $316_5$ has four submitted jobs 314 with $RESREQ_3$ $422_3$ resource requirements. As illustrated in FIG. 4, jobs 314 are grouped based on the resource requirements of the respective jobs 314 and the user 316 submitting the job 314. The jobs 314 are also sorted and/or otherwise grouped based on priority policies into queues $410_1$ and $410_2$.

In operation, meta-scheduler 320 will analyze, determine and/or otherwise match resource requirement buckets or groups 422 to mega-host resource attribute data 370 to identify candidate mega-hosts 360 for each resource requirement group 422 of jobs 314. At the end of the matching process, mega-hosts 360 that cannot satisfy the resource requirements of the resource requirement group 422 will have been removed and/or filtered out of a list of candidate mega-hosts 360 that can satisfy the resource requirements of the group 422. In some instances, because many jobs 314 submitted have the same or similar resource requirements and may be submitted by the same user, organizing or sorting the jobs 314 by resource requirements and/or submitting user provides greater efficiency in identifying candidate execution clusters 312 for processing the jobs 314. During allocation of jobs 314 to particular execution clusters 312, meta-scheduler 320 may select jobs 314 based on priority policies (e.g., selecting from priority queues $410_1$ or $410_2$) and schedule jobs 314 against candidate mega-hosts 360. Thus, for example, if during a particular scheduling cycle a particular job 314 corresponding to a particular resource requirement group 422 has been evaluated and marked "cannot be forwarded" or is otherwise determined that resources are currently unavailable to process the corresponding job 314, all other jobs belonging to the same resource requirement group 422 may be ignored during this scheduling cycle.

As described above, meta-scheduler 320 may forward jobs 314 to back-end execution clusters 312 based on a number of different job forwarding policies, alone or in combination. In some embodiments, system 300 uses logical resources to represent physical resources in grid environment 302. For example, resources may be categorized by several ways, such as by scope: host-based resources and shared resources. Host-based resources are associated with individual hosts and represent the attributes of the hosts. Examples of host-based resources may include host type, host model, maximum memory, maximum swap, total number of slots/cpus and total available memory etc. Shared resources are not associated with individual hosts but are instead shared by the entire cluster or a subset of hosts within the cluster. Examples of shared resources are software licenses or disk space on shared file systems that is mounted by several hosts. Resources may also be categorized by values: Boolean resources, numeric resources and string resources. For instance, "slot" can be a numeric resource to represent number of job slots on a host, "bigmem" can be a boolean resource to represent that host has a large RAM, "Fluent" can be a numeric resource that represents a total number of available fluent licenses in the cluster, "FluentVersion" can be a string resource that represents the version string of FLUENT software in the cluster. The Boolean resource is a host-based resource, while numeric and string resources can be either host-based or shared resources. Only a numeric resource can be consumable that can be allocated to a workload. Resources can also be categorized by the way values change: dynamic resources and static resources. Dynamic resources are the resources that change their values dynamically, for instance, available memory. Static resources are the resources that do not change their values.

In some embodiments of the present disclosure, resources are defined in each execution cluster 312 and will be used for back-end execution cluster 312 local job scheduling. In order for meta-scheduler 320 to be resource aware, the resource information will be collected and updated to meta-scheduler 320 periodically (requested and/or obtained by meta-scheduler 320 or pushed by respective execution clusters 312 to meta-scheduler 320). For resources defined in mega-host 360 matching criteria, the resources become attributes of the mega-host 360. Among them, numeric and string resources will preserve the value, for instance, "host type of mega-host is Linux". Some of the numeric shared resources will be kept independent from mega-host based resources, like floating license resources for meta-scheduler 320 consideration. Remaining resources may become a Boolean attribute of a mega-host 360, whether the resource exists or not.

As described above, meta-scheduler 320 schedules and/or forwards jobs 314 to execution clusters 312 for processing. Each execution cluster 312 maintains some number of pending jobs 314 in a pending job queue. Instead of defining an arbitrary number for a pending job queue length, meta-scheduler 320 uses a dynamic method to calculate this number based on resource capacity and job resource requests/requirements. A forwarding resource ratio is used by meta-scheduler 320 to derive the number of jobs 314 to allocate to a pending job queue of a respective execution cluster 312. The ratio is used to calculate total forward resources (Total_forward$_{res}$) based on total resource capacity (Total$_{res}$) as set forth below:

$$\text{Total\_forward}_{res} = \text{Forward\_Ratio} * \text{Total}_{res}$$

This is a generic formula applying to different types of resources "res". Meta-scheduler 320 uses total forward resources (Total_forward$_{res}$) to schedule and control the number of forwarded jobs 314 according to job requests. This determines the number pending jobs for an execution cluster 312 as set forth below:

$$\sum_{i=1}^{N} \text{Alloc}_{res}(R_i) + \sum_{j=1}^{M} \text{Ask}_{res}(FP_j) <= \text{Total\_forward}_{res}$$

$$\sum_{i=1}^{N} \text{Alloc}_{res}(R_i) <= \text{Total\_forward}_{res} - \sum_{i=1}^{N} \text{Ask}_{res}(R_i)$$

where Alloc$_{res}$(R) is the amount of resources allocated to running job R, Ask$_{res}$(FP) is the amount of resource requested by a forwarded pending job FP, N is the number of running jobs using the resource "res", and M is the number of forwarded pending jobs requesting the resource "res". Since the number of jobs 314 requesting a resource may be different, this resource capacity aware approach dynamically adjusts pending queue length for an execution cluster 312 based on the job 314 request and the best execution cluster 312 to satisfy the needs of the job 314. The forwarding resource ratio can be defined in multiple levels (e.g., system wide (e.g., applying to all types of resources in all execution clusters 312), execution cluster wide (e.g., applying to all resources in a specific execution cluster 312), resource type (e.g., applying to a defined resource type for all execution clusters 312 or for specified execution clusters 312) or mega-host level (e.g., applying to defined mega-host 360 slots in a specified execution cluster 312). Each one controls a different scope, and a lower level may have a narrower scope. For example, if total number of slots for one execution cluster is 100 and the ratio is 1.5, total forward slots for this execution cluster 312 will be 150. If all jobs 314 are asking for one slot, meta-scheduler 320 can forward 150 jobs 314 to the back-end execution cluster 312. If the number of running jobs is 100, there will be 50 pending jobs. On the other hand, if all jobs are asking for two slots, meta-scheduler 320 can forward 75 jobs to the back-end execution cluster 312. In this case, if the number of running jobs is 50, there will be 25 pending jobs. A lower level ratio defines more specific and narrowing scope and will overwrite higher level ratio definitions. For instance, a resource type base ratio (applying to all resources of a particular type for all execution clusters 312) may be configured to will overwrite both execution cluster wide and system wide ratios. Here are a few examples. If the system wide ratio is 1.5, if execution cluster A has 100 slots and 50 licA licenses in total, the total forward slots will be 150 and total forward licA licenses will be 75. If execution cluster B has 200 slots and 20 licB licenses, the total forward slots will be 300 and total forward licB licenses will be 30. If the system wide ratio is 1.5, but execution cluster B defines a different ratio for licB (2.0), in this case, total forward slots will remain as the same as previous case, 150 for execution cluster A and 300 for execution cluster B. Total_forward licA licenses will be 75, while total forward licB licenses will be 40. Multiple level forwarding resource ratios enable flexibility to serve different conditions. For instance, if one execution cluster 312 is designed to handle lots of short jobs 314, this execution cluster 312 forwarding ratio can be set a larger value to allow a larger job queue length in order to maintain high throughput and utilization.

As indicated above, jobs 314 submitted to submission cluster 310 have a resource requirement. In some embodiments, this job resource requirement as a whole will be forwarded to the respective execution cluster 312 and eventually evaluated by a respective back-end scheduler 334/336 when doing local job scheduling. A typical resource requirement evaluation in a back-end execution cluster 312 may include two parts. The first part is to evaluate an expression statement of the resource requirement against each execution cluster host 344 to check the existence of the needed resource and its value (e.g., to identify candidate execution hosts 344 for the job). For example, the expression/statement "select[defined(licA) && mem>1000]" may indicate a request to identify an execution host 344 that can access a licA resource and has available memory greater than 1000 megabytes. The second part of the resource requirement evaluation is to check resource availability and perform a reservation for processing the job. For instance, if a job requests needs two slots and one licA resource, the local scheduler 334/336 will try to identify execution hosts 344 to run the job and reserve two slots and one licA resource.

In some embodiments, meta-scheduler 320 evaluates job resource requirement data 322 corresponding to submitted jobs 314. For example, if a particular job 314 requests a "bigmem" execution host 344, meta-scheduler 320 should not forward this job 314 to an execution cluster 312 that does not have this type of resource. However, due to the complexity of resource evaluation and dynamic changing nature of certain resources, it may be inefficient and/or unnecessary for meta-scheduler 320 to evaluate the full job resource requirement for a particular job 314. For example, the available memory of a particular execution host 344 may change dynamically. If one execution host 344 temporarily cannot satisfy a job memory requirement, this may only mean that this particular job cannot use this particular execution host 344 at the present time (but may be able to use it later). In this case, the job can still be forwarded to the particular execution host 344. In some embodiments, meta-scheduler 320 only evaluates a subset of the job resource requirement. For scheduling efficiency purposes, meta-scheduler 320 will evaluate the resource requirement against mega-hosts 360 instead of individual execution hosts 344. This simplified evaluation may be defined by the following: 1) checking existence of all resources in the resource requirement; 2) checking the value of resources defined in mega-host 360 matching criteria; 3) checking the maximal value of selected dynamic resources; and 4) checking availability of selected reserved resources. In the first phase, all resources appearing in the resource requirement for a job will be checked for their existence for each mega-host 360. For example, for the requirement "select[bigmem] rusage [licA=1]", meta-scheduler 320 will check both bigmem Boolean resources and licA numeric shared resources. If any resource does not exist or cannot be used by mega-host 360, the particular mega-host 360 will be ignored. If any resource does not exist in a particular execution cluster 312 as defined by the mega-host 360 definition, the execution cluster 312 will be ignored for job forwarding scheduling. In the second phase, for all resources appearing in an expression statement, if a resource is a numeric or string resource defined in mega-host 360 matching criteria, meta-scheduler 320 will perform the evaluation and check the value. For example, for the expression/statement "select[fluentVersion "version10"]", meta-scheduler 320 will check if the fluentVersion string resource value on a particular mega-host 360 is equals to "version10". If the value of resource does not satisfy the resource requirement, the evaluation will fail and the particular mega-host 360 (or execution cluster 312) will be ignored for job forwarding scheduling. In phase three, since the value of dynamic resources may change, if checking the resource requirement requires value checking for a dynamic resource, meta-scheduler 320 will ignore this checking requirement. However, if a maximal value of a dynamic resource is known, meta-scheduler 320 will use those values to conduct the checking. For example, for total available memory and total available swap, the corresponding maximal values are known. If the resource requirement requests "select[mem>1000]", meta-scheduler 320 will use the maximal values of mega-hosts 360 to replace available memory and perform the corresponding checking. If the checking fails to meet the requirement, it means the mega-host 360 (and execution cluster 312) can never satisfy the requirement, and thus the mega-host 360 (and execution cluster 312) will be ignored for job forwarding scheduling. In phase four, for a resource reservation requirement, meta-scheduler 320 checks total availability of the resource. If the amount of available total forward resource cannot satisfy the job requirement, the mega-host 360 (and execution cluster 312) will be ignored for job forwarding scheduling. For all reservation resources, the following condition checking should be satisfied in order to make a particular mega-host 360 (or execution cluster 312) a candidate:

$$\Sigma_{i=1}^{N} Alloc_{res}(R_i) + \Sigma_{j=1}^{M} Ask_{res}(FP_j) + Ask_{res}(P) <= \text{Total\_forward}_{res}$$

where $Ask_{res}(P)$ is the number of resources "res" requested by a scheduled pending job in meta-scheduler 320. For example, if a job requests two 2 slots and one licA, if execution cluster $312_1$ has ten available slots and no licA left, this execution cluster will be ignored for job forwarding scheduling.

After resource requirement evaluation, there will be multiple candidate mega-hosts 360 (and corresponding execution clusters 312) for the job (e.g., each passing job resource requirement evaluation and having enough available forward resources to satisfy the reservation request). Meta-scheduler 320 employs an election algorithm to select the best mega-host 360 (and execution cluster 312) for the job. The election algorithm enables the forwarding of jobs quicker and balances workload among back-end execution clusters 312. The election algorithm performs two levels of sorting: execution cluster 312 sorting and mega-host 360 sorting within each execution cluster 312. After sorting, the best execution cluster 312 will be selected to forward the job and the mega-hosts 360 within this execution cluster 312 will be used for the reservation. The sorting algorithm considers the following two types of resources, slots and numeric shared resources. The following exemplary symbols/equations relate to slots in the sorting algorithm:

$Total_{slot}(MH)$: total slots of candidate mega-host (MH).

$Total_{slot}(C)$: total slots of all candidate mega-hosts in execution cluster (C).

If Z is number of candidate mega-hosts in an execution cluster, the value can be calculated as below:

$$Total_{slot}(C) = \Sigma_{i=1}^{Z} Total_{slot}(MH_i)$$

$Total\_forward_{slot}$ (MH): total forward slots of candidate mega-host MH. $Total\_forward_{slot}(MH)$ will be calculated based on forwarding resource Forward_ratio(MH) and $Total_{slot}$ (MH):

$$Total\_forward_{slot}(MH) = Forward\_Ratio(MH) * Total_{slot}(MH)$$

$Total\_forward_{slot}(C)$: total forward slots of all candidate mega-hosts in execution cluster C.

$$Total\_forward_{slot}(C) = \Sigma_{i=1}^{Z} Total\_forward_{slot}(MH_i)$$

$Alloc_{slot}$ (R, MH): the amount of slots allocated to the running job Ron candidate mega-host MH.

$Alloc_{slot}$ (R, C): the amount of slots allocated to the running job R on all candidate mega-hosts in execution cluster C. It can be calculated by:

$$Alloc_{slot}(R,C) = \Sigma_{i=1}^{Z} Alloc_{slot}(R,MH_i)$$

$Ask_{slot}$(FP, MH): the amount of slots requested by forwarded pending jobs FP on candidate mega-host MH.

$Ask_{slot}$ (FP, C): the amount of slots requested by forwarded pending jobs FP on all candidate mega-hosts in execution cluster C. It can be calculated by:

$$Ask_{slot}(FP,C) = \Sigma_{i=1}^{Z} Ask_{slot}(FP,MH_i)$$

For numeric shared resources, the following symbols/equations may be defined: $Total_{share}(C)$, $Total\_forward_{share}(C)$, $Alloc_{share}(R, C)$, and $Ask_{share}(FP, C)$ to represent the total number of numeric shared resources "share" on execution cluster "C", the total number of numeric shared forward resources "share" on execution cluster "C", the number of allocated numeric shared resource "share" for the running job Ron execution cluster "C", and the number of asked/requested numeric shared resources "share" for a forwarding pending job FP on execution cluster "C", respectively. The notations $Ask_{slot}$ (P) and $Ask_{share}(P)$ represent the number of requested slots and numeric shared resource "share" for current scheduled pending jobs.

Available resource capacity represents logical available resources that can be allocated to a new running job. The available resource capacity can be calculated based on total capacity of resources, total allocated resources and the amount of requested resources for existing forwarding pending jobs as below:

$$\text{Avail\_cap}_{res} = \text{MAX}(0, \text{Total}_{res} - \Sigma_{i=1}^{N}\text{Alloc}_{res}(R_i) - \Sigma_{j=1}^{M}\text{Ask}_{res}(FP_j))$$

$$\text{Avail\_cap\_ratio}_{res} = \text{Avail\_cap}_{res}/\text{Total}_{res}$$

Available resource capacity ratio normalizes the available resource capacity based on total resources. In the election algorithm, the available resource capacity ratio is used to balance workload among mega-hosts 360 (or execution clusters 312). Below are exemplary definitions/equations for available slots capacity and available slots capacity ratio of candidate mega-host 360 and execution clusters 312:

$\text{Avail\_cap}_{slot}(MH)$: available slots capacity of candidate mega-host MH. It can be calculated as below:

$$\text{Avail\_cap}_{slot}(MH) = \text{MAX}(0, \text{Total}_{slot}(MH) - \Sigma_{i=1}^{N}\text{Alloc}_{slot}(R_i, MH) - \Sigma_{j=1}^{M}\text{Ask}_{slot}(FP_j, MH))$$

$$\text{Avail\_cap\_ratio}_{slot}(MH) = \text{Avail\_cap}_{slot}(MH)/\text{Total}_{slot}(MH)$$

$\text{Avail\_cap}_{slot}(C)$: available slots capacity of all candidate mega-hosts in execution cluster C. The value can be calculated as below:

$$\text{Avail\_cap}_{slot}(C) = \Sigma_{i=1}^{Z}\text{Avail\_cap}_{slot}(MH_i)$$

$$\text{Avail\_cap\_ratio}_{slot}(C) = \text{Avail\_cap}_{slot}(C)/\text{Total}_{slot}(C)$$

Similarly, $\text{Avail\_cap}_{share}(C)$ and $\text{Avail\_cap\_ratio}_{share}(C)$ represent available numeric shared resource capacity and available numeric shared resource capacity ratio for resource "share", respectively:

$$\text{Avail\_cap}_{share}(C) = \text{MAX}(0, \text{Total}_{share}(C) - \Sigma_{i=1}^{N}\text{Alloc}_{share}(R_i, C) - \Sigma_{j=1}^{M}\text{Ask}_{share}(FP_j, C))$$

$$\text{Avail\_cap\_ratio}_{share}(C) = \text{Avail\_cap}_{share}(C)/\text{Total}_{share}(C)$$

"Pending Ratio" represents the relative pending queue length for each mega-host 360 and execution cluster 312. The pending ratio can be calculated based on total resources, total allocated resources, total amount of requested resources for forwarding pending jobs and total forward resource as indicated below:

$$\text{Pend\_ratio}_{res} = \text{MAX}(0, (\Sigma_{i=1}^{N}\text{Alloc}_{res}(R_i) + \Sigma_{j=1}^{M}\text{Ask}_{res}(FP_j) - \text{Total}_{res}))/\text{Total\_forward}_{res}$$

For example, if execution cluster A has 100 slots, 150 forward slots, 90 allocated slots and 30 forward pending slots, pending ratio will be (90+30−100)/150=0.13333. Again, pending ratio is used to balance workload among mega-hosts 360 and execution clusters 312. Slot pending ratio and numeric shared resource pending ratio will be defined as below:

$\text{Pend\_ratio}_{slot}$ (MH): slot pending ratio of candidate mega-host MH. It can be calculated as below:

$$\text{Pend\_ratio}_{slot}(MH) = \text{MAX}(0, (\Sigma_{i=1}^{N}\text{Alloc}_{slot}(R_i, MH) + \Sigma_{j=1}^{M}\text{Ask}_{slot}(FP_j, MH) - \text{Total}_{slot}(MH)))/\text{Total\_forward}_{slot}(MH)$$

$\text{Pend\_ratio}_{slot}(C)$: slot pending ratio of all candidate mega-hosts in execution cluster C. It can be calculated as below:

$$\text{Pend\_ratio}_{slot}(C) = (\Sigma_{i=1}^{N}\text{Alloc}_{slot}(R_i, C) + \Sigma_{j=1}^{M}\text{Ask}_{slot}(FP_j, C) - \text{Total}_{slot}(C))/\text{Total\_forward}_{slot}(C)$$

$\text{Pend\_ratio}_{share}$: numeric shared resource pending ratio. It can be calculated as below:

$$\text{Pend\_ratio}_{share}(C) = (\Sigma_{i=1}^{N}\text{Alloc}_{share}(R_i, C) + \Sigma_{j=1}^{M}\text{Ask}_{share}(FP_j, C) - \text{Total}_{share}(C))/\text{Total\_forward}_{share}(C)$$

When a job asks/requests for more than one type of resource, some resources may be more critical for execution cluster election calculation than others. For example, a certain software license can be very expensive and relatively scarce compared with a computing slot. When a job requests for both this type of license and slot, if one execution cluster has an available license but no slot, while the second execution cluster does have the slot but no available license, the first execution cluster will be preferred instead of the second execution cluster. Resource weight factor ($\text{Weight}_{res}$) is used to represent the importance of each type of resource. Different types of resources can have different weight factors. The notations $\text{Weight}_{slot}$ and $\text{Weight}_{share}$ are used to represent corresponding slot weight and numeric shared resource "share" weight values. The default values are 1, which are equally important.

As an example, consider that a particular job asks for or requests a slot and W types of numeric shared resources. The execution cluster election algorithm will consider both slot and all requested shared resources (share_1, share_2, ... share_W). The notation all_share_status(P, C) represent the status of all available numeric shared resources on execution cluster "C" for job P.

all_share_status(P, C): checking status of all available numeric shared resources (share_1 ... share_W) on execution cluster "C" for job P.

1: all numeric shared resources, available resource capacity can satisfy job requests.

For each share resource k in 1 ... W $$\text{Avail\_cap}_{share\_k}(C) >= \text{Ask}_{share\_k}(P)$$

−1: all numeric shared resources, available resource capacity cannot satisfy job requests For each share resource k in 1 ... W $$\text{Avail\_cap}_{share\_k}(C) < \text{Ask}_{share\_k}(P)$$

0: available resource capacity of some resources can satisfy job requests

At least one resource k in 1 ... W, $\text{Avail\_cap}_{share\_k}(C) > \text{Ask}_{share\_k}(P)$ At least one resource m in 1 ... W $\text{Avail\_cap}_{share\_m}(C) < \text{Ask}_{share\_m}(P)$ The notations Total_weighted_avail_cap_ratio (P, C) represents weighted available resource capacity ratio, and Total_weighted_pend_ratio(P, C) represents weighted pending ratio as below:

$$\text{Total\_weighted\_avail\_cap\_ratio}(P,C) = \text{Weight}_{slot}*\text{Avail\_cap\_ratio}_{slot}(C) + \Sigma_{k=1}^{W}\text{Weight}_{share\_k}*\text{Avail\_cap\_ratio}_{share\_k}(C)$$

$$\text{Total\_weighted\_pend\_ratio}(P,C) = \text{Weight}_{slot}*\text{Pend\_ratio}_{slot}(C) + \Sigma_{k=1}^{W}\text{Weight}_{share\_k}*\text{Pend\_ratio}_{share\_k}(C)$$

The election algorithm of meta-scheduler 320 compares candidate execution clusters 312 one by one and picks the best one. The election algorithm handles three different scenarios when comparing two execution clusters 312, say $C_i$ and $C_j$:

1) Available slot capacity and all available numeric shared resource capacity of one of the execution clusters that can satisfy the job request:

```
If (Avail_cap_slot (C_i) >= Ask_slot(P) && all_share_status(P,C_i) > 0
    && Avail_cap_slot (C_j) >= Ask_slot(P) && all_share_status(P,C_j) > 0)
    if ( Total_weighted_avail_cap_ratio(P,C_i) >
         Total_weighted_avail_cap_ratio(P,C_j) )
        Pick C_i
    else
        Pick C_j
    endif
else if (Avail_cap_slot (C_i) >= Ask_slot(P) && all_share_status(P,C_i) > 0)
    pick C_i
else if (Avail_cap_slot (C_j) >= Ask_slot(P) && all_share_status(P,C_j) > 0)
    pick C_j
endif
```

2) Available slot capacity and all available numeric shared resource capacity of both execution clusters cannot satisfy job request:

```
If (Avail_cap_slot (C_i) < Ask_slot(P) && all_share_status(P,C_i) < 0
    && Avail_cap_slot (C_j) < Ask_slot(P) && all_share_status(P,C_j) < 0)
    if ( Total_weighted_pend_ratio(C_i) <
         Total_weighted_pend_ratio(C_j) )
        Pick C_i
    else
        Pick C_j
    endif
endif
```

3) For both clusters, either available slot capacity or some available numeric shared resource capacity can satisfy the job request. The election will consider Total_weighted_avail_cap_ratio(P, C):

```
if ( Total_weighted_avail_cap_ratio(C_i) <
     Total_weighted_avail_cap_ratio(C_j) )
    Pick C_i
else
    Pick C_j
endif
```

After selecting the best candidate execution cluster 312, meta-scheduler 320 will order the mega-hosts 360 within the selected candidate execution cluster 312. The mega-host 360 ordering algorithm sorts and orders all candidate mega-hosts 360 by slot. If $Avail\_cap\_ratio_{slot}(MH)$ is greater than zero, place the mega-host 360 with larger $Avail\_cap\_ratio_{slot}(MH)$ value in the first place. If none of the $Avail\_cap\_ratio_{slot}(MH)$ is greater than zero, the job has to wait in the queue. In this case, the mega-host 360 with smaller $Pend\_ratio_{slot}(MH)$ value is placed in the first place. The following is an exemplary ordering algorithm:

```
If (Avail_cap_ratio_slot(MH_i) > 0 || Avail_cap_ratio_slot(MH_j) > 0 )
    If (Avail_cap_ratio_slot(MH_i) > Avail_cap_ratio_slot(MH_j))
        Put MH_i in the first place
    Else If (Avail_cap_ratio_slot(MH_i) < Avail_cap_ratio_slot(MH_j))
        Put MH_j in the first place
    Else
        If (Pend_ratio_slot(MH_i) < Pend_ratio_slot(MH_j))
            Put MH_i in the first place
        Else
            Put MH_j in the first place
        Endif
    Endif
Else
    If (Pend_ratio_slot(MH_i) < Pend_ratio_slot(MH_j))
        Put MH_i in the first place
    Else
        Put MH_j in the first place
    Endif
Endif
```

Figure 5:
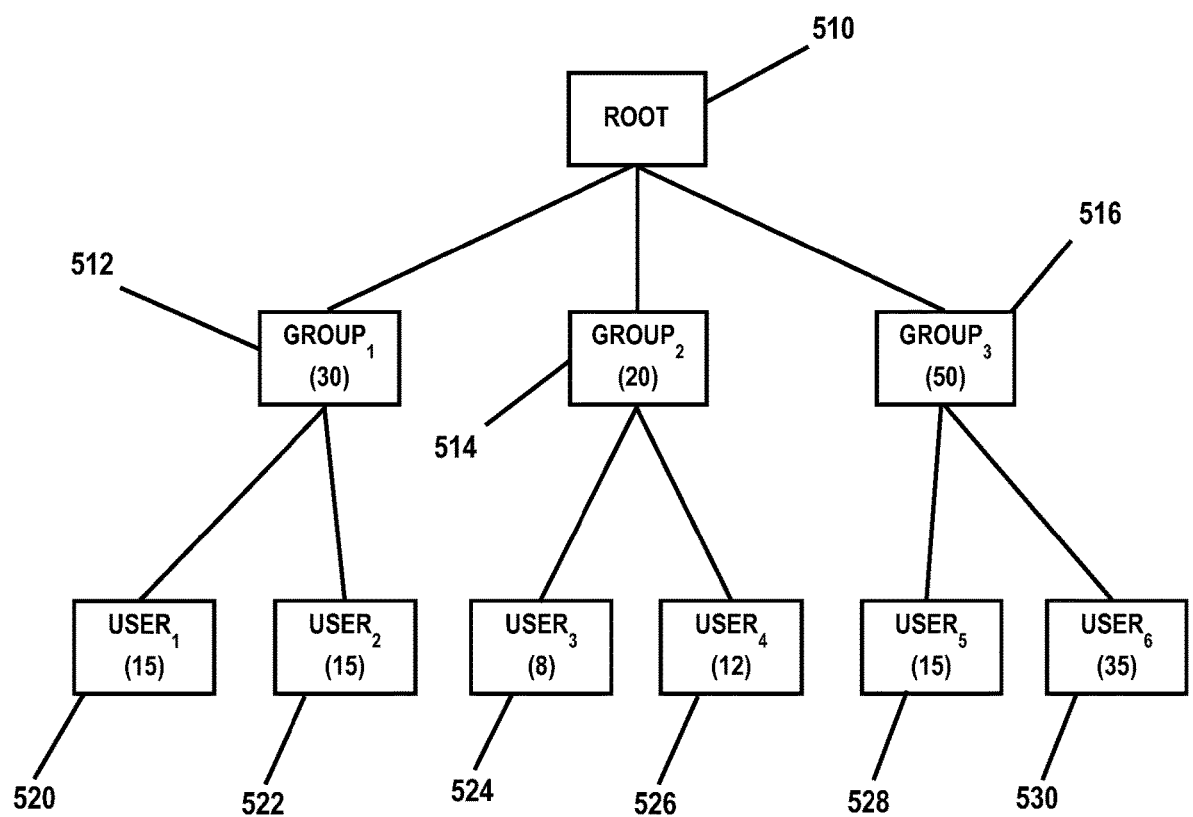
FIG. 5 is a diagram illustrating a hierarchy fair-share tree example of grid resource share allocation according to the present disclosure.

Meta-scheduler 320 may also utilize a share or fair-share policy for job forwarding to execution clusters 312. A fair-share policy is configured to divide the processing power of a cluster among multiple resource consumers (user groups, project groups, users) to provide fair access to resources. In some embodiments, the fair-share policy assigns a fixed number of shares to each user or group. These shares represent a fraction of the resources that are available in the execution clusters 312. FIG. 5 is a diagram illustrating a hierarchy fair-share tree example of share allocation according to the present disclosure. In FIG. 5, there are ten tree nodes comprising a root node 510, three user group nodes 512, 514 and 516, and six user nodes 520, 522, 524, 526, 528 and 530. The most important users or groups are generally allocated a greater number of shares. FIG. 5 is a diagram illustrating an allocation of shares among different groups (e.g., project groups) and among different users of the respective groups. For example, user groups 512, 514 and 516 are allocated 30, 20 and 50 shares, respectively. Each user within a particular user group may be allocated a fixed number or percentage of the shares allocated to the respective user group. For example, in FIG. 5, $user_1$ is allocated 15 shares (e.g., 50% of the shares allocated to user group 512), $user_2$ is allocated 15 shares, $user_3$ is allocated 8 shares (e.g., 40% of the shares allocated to user group 514), $user_4$ is allocated 12 shares, $user_5$ is allocated 15 shares (e.g., 30% of the shares allocated to user group 516), and $user_6$ is allocated 15 shares.

During scheduling, the fair-share scheduling algorithm of meta-scheduler 320 calculates a dynamic user priority for users or groups, depending on how the shares are assigned, the fair-share formula and the consumed resources. The priority is dynamic because it changes as soon as any variable in the formula changes. By default, a user's dynamic priority gradually decreases after a job starts, and the dynamic priority immediately increases when the job finishes. The more resources that workloads consume, the less priority corresponding to the consumer/user will be. Upon selecting the highest priority fair-share tree node, meta-scheduler 320 will select the first priority job under this tree node and schedule it. For a hierarchy tree structure, meta-scheduler 320 may traverse the tree or hierarchy structure from top to bottom (the top having a greater number of shares), select the tree node with the highest priority and continuing to deeper/lower levels. An exemplary fair-share formula may include:

Dynamic_Priority=number_shares/weighted_resource_usage

Weighted_resource_usage can be calculated as follows:

Weighted_resource_usage=
(cpu_time*CPU_TIME_FACTOR+
run_time*RUN_TIME_FACTOR+(1+job_slots)
*RUN_JOB_FACTOR+
fairshare_adjustment*FAIRSHARE_ADJUSTMENT_FACTOR)

where number_shares: the number of shares assigned to the user; cpu_time: the cumulative CPU time used by the user; run_time: the total run time of running jobs; job_slots: the number of job slots reserved and in use from a user account, where $\text{Alloc}_{slot}(R, C)$ is the total resource allocation for running jobs at the cluster; and fairshare_adjustment: the adjustment calculated by customized external factors (e.g., job memory).

To support fair-share aware or share-based job forwarding by meta-scheduler 320, for all factors required by the weighted_resource_usage calculation, the back-end execution clusters 312 will update workload values to the front-end meta-scheduler 320. However, because a forwarded pending job may not be scheduled and run right away by a back-end execution cluster 312, resource usage alone may not fully satisfy forwarding fair-share requests. As an example, consider if userA and userB have equal shares, userA submits all his workloads first, then userB's workloads. Meta-scheduler 320 selects userA's workload first. Since meta-scheduler 320 is efficient and can schedule many jobs within each scheduling cycle, before userA jobs can run, userA weighted_resource_usage value will remain the same. In this case, all userA jobs will be forwarded before any userB workload can be considered, which may cause unfair access to the back-end execution clusters 312. To handle this scenario, the fair-share formula considers current consumed resources for all workloads of a fair-share resource consumer and requested resources by forwarding pending jobs. An exemplary fair-share algorithm may be defined as:

Dynamic_Priority=number_shares/(weighted_resource_usage+ forward_pending_slots*FORWARD_PENDING_FACTOR)

forward_pending_slots=$\Sigma_{j=1}^{M}\text{Ask}_{slot}(FP_j)$ where M: number of forwarded pending jobs belonging to each resource consumers.

Figure 6:
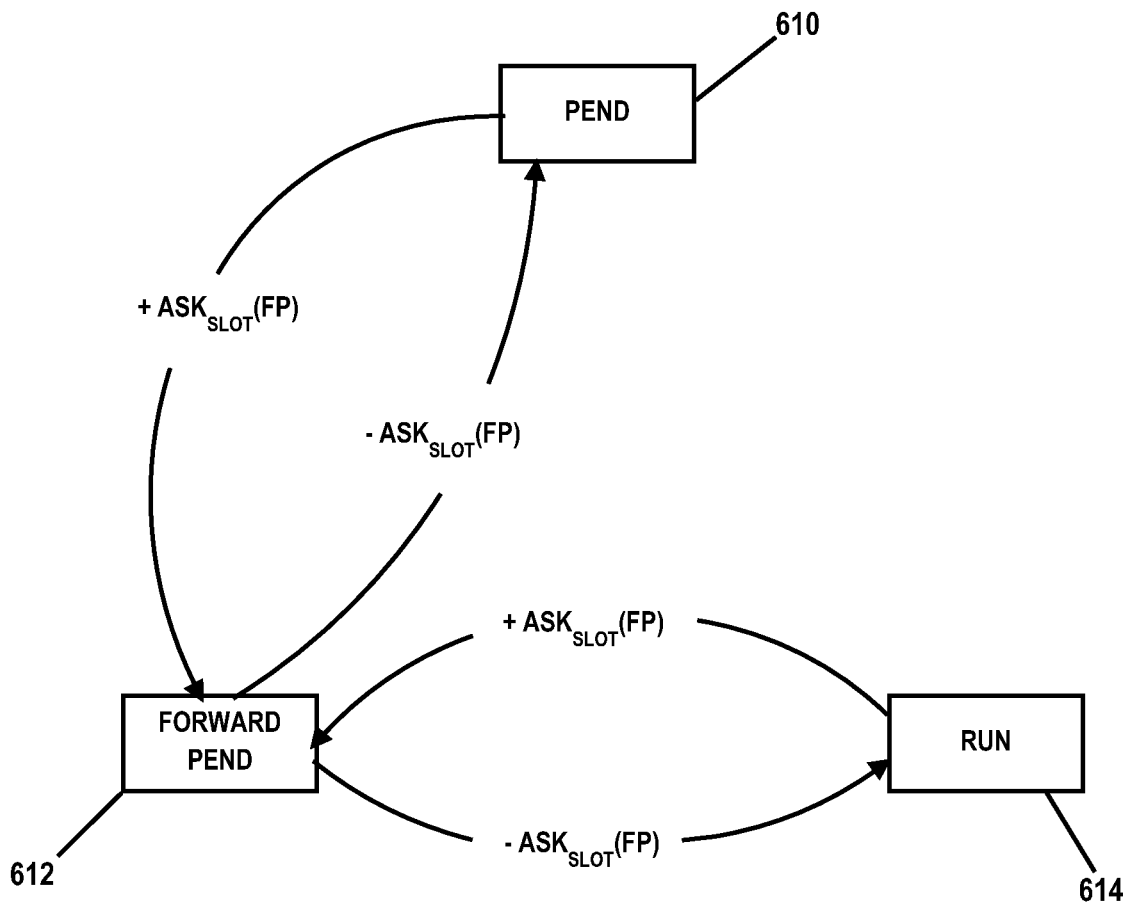
FIG. 6 is a diagram illustrating a job transition process using a fair-share-forwarding policy in a grid environment according to the present disclosure.

With the foregoing process, as long as one consumer's workloads have been forwarded, the consumer's priority will be decreased. This will give a chance for workloads from other consumers to be forwarded. FIG. 6 is a diagram illustrating a job transition process using a fair-share-forwarding policy according to the present disclosure. In FIG. 6, three job transition states are illustrated: PEND 610 (job is pending disposition to a particular execution cluster 312 (e.g., the job is pending at submission cluster 310 awaiting forwarding by meta-scheduler 320 to a particular execution cluster 312)); Forward PEND 612 (job is in a forward pending queue of a particular execution cluster 312); and RUN 614 (job is running in a particular execution cluster 312). The foward_pending_slots value will be dynamically updated based on job status transition as follows: PEND>Forward PEND: job is forwarded, forward_pending_slots will be increased by $\text{Ask}_{slot}(FP)$; Forward PEND>PEND: job needs to be unforwarded (waiting too long, being pulled back for re-scheduling etc.), forward_pending_slots will be decreased by $\text{Ask}_{slot}(FP)$; Forward PEND>RUN: job is being scheduled by execution cluster scheduler 334/336 and runs, forward_pending_slots will be decreased by $\text{Ask}_{slot}(FP)$; RUN>Forward PEND: job is re-queued for re-scheduling, foward_pending_slots will be increased by $\text{Ask}_{slot}(FP)$.

A generic job forwarding limit may also be used by meta-scheduler 320 for forwarding jobs to back-end execution clusters 312. For example, many organizations deploy some form of resource limit policies to prevent a single user or group from excessively using the entire computing cluster. In a single cluster environment, the limit can be set to control a maximum amount of resources (e.g., slot, memory, swap, licenses, job and external resources, etc.) consumed by workloads from multiple consumers (user, user groups, projects, queues, hosts, etc.). For example, user "John" from project "ABC" cannot use more than 1000 cpus, etc. A similar concept can be applied by meta-scheduler 320 such that instead of controlling total consumed resources, a generic job forwarding resource limit mechanism can be used to control total reserved resources by forwarded jobs including both running and forward pending workloads. The limits can be configured to enforce following types of resources as an example:

Slots: total number of slots reserved by forwarded jobs.
Numeric shared resources: total number of numeric shared resources reserved by forwarded jobs, for instance, software licenses
Jobs: total number of forwarded jobs The limits can also be applied to following types of consumers:

Users and user groups
Clusters
Queues
Projects

A consumer scope can be defined as:

Individual consumer: for instance, userA, execution clusterB
A list of consumers: for instance, usergroupA, usergroupB, usergroupC
All consumers: for instance, all clusters
Per-consumer: for instance, per-user means every user In some embodiments, consumers can be combined together. For example, a limit can be defined as 1000 cpus for jobs from project DesignModel on back-end execution cluster clusterA and clusterB. If a consumer is not specified, it means "ALL" consumers. In the above example, it means all users and all queues. During scheduling, meta-scheduler 320 checks the job against all defined generic forwarding limits. If all of the forwarding resources have been reserved, no more jobs can be forwarded. In some embodiments, meta-scheduler 320 uses the following checking condition for each limit:

Forward_limit$_{res}$: A generic limit defined for res (resource) type; res can be numeric shared resource, slot or job where N: number of running jobs belonging to limit consumers; M: number of forwarded pending jobs belonging to limit consumers; and $\text{Ask}_{res}(P)$: the number of resources "res" requested by a scheduling pending job belonging to limit consumers. Thus, if the forwarding resources are less than or equal to Forward_limit$_{res}$, the job can be forwarded based on the following exemplary formula:

$$\Sigma_{i=1}^{N}\text{Alloc}_{res}(R_i)+\Sigma_{j=1}^{M}\text{Ask}_{res}(FP_j)+\text{Ask}_{res}(P)<=\text{Forward\_limit}_{res}$$

Meta-scheduler 320 may also be configured to employ a mega-host 360 cluster preference job forwarding policy. The job submission interface of submission cluster 310 may be configured to enable users to define a list of execution hosts 344 or execution host 344 groups as candidates for job processing. For example, in some embodiments, the job resource requirement data 322 may specify preference data 380 comprising information associated with preferred execution hosts and/or levels of preference. To change the order of preference among candidates, the interface may be configured to enable a plus (+) after the names of execution hosts 344 or execution host 344 groups that a user would prefer to use, optionally followed by a preference level. For preference level, a positive integer may be specified with higher numbers indicating greater preferences for those execution hosts 344. It should be understood that other methods may also be used to indicate host preferences and/or a level of preference. Meta-scheduler 320 may be configured with a job submission interface various cluster designations with extension of cluster selection and preference as indicated below:

Host name[+pref_level]
Host group name[+pref_level]
Cluster name[+pref_level]

For example, a job submission preference string may indicate: "short_job_cluster+4 host_groupB+2 hostA" (which indicates that the job preference is to use cluster "short_job_cluster" first, then host group "host_groupB", and the last preferred will be host "hostA"). In some embodiments, back-end execution cluster 344 local scheduler 334/336 will perform a final execution host 344 selection based on execution host preference. However, meta-scheduler 320 selects the mega-host 360 and corresponding execution cluster 312 based on the specified execution host and preference list. There may be two phases to resource matching performed by meta-scheduler 320: 1) mega-host 360/execution cluster 312 mapping phase; and 2) mega-host 360/execution cluster 344 election. Meta-scheduler 320 receives host, host group and cluster membership and locality information from back-end execution clusters 312. Meta-scheduler 320 has information of which execution host 344 belongs to which host group on which execution cluster 312. This information will be used during the host/cluster mapping phase. In the mapping phase, meta-scheduler 320 goes through specified host/cluster preference request list information and translates the information into a mega-host 360 preference request list and execution cluster 312 preference request list. Meta-scheduler 320 may use the following procedure:

- For an individual execution host 344, find the corresponding mega-host 360 this execution host 344 belongs to and place mega-host 360 into the mega-host 360 preference request list and keep preference level. Same thing applies to execution cluster 312 (place execution cluster 312 into the cluster preference request list and keep preference level).
- For execution host group, go through each execution 344 host in the host group and use the similar approach as individual execution host 344 and identify corresponding sets of mega-hosts 360 and place them into the mega-host 360 preference request list and keep preference level. Same thing applies to cluster 312 (place execution clusters 312 of mega-hosts 360 into the cluster preference request list and keep preference level).
- For execution cluster 312, place all mega-hosts 360 within the cluster 312 into the mega-host 360 preference request list and keep preference level. Also place cluster 312 into the cluster preference request list and keep preference level.
- For mega-host 360 preference request list, if mega-host 360 appears multiple times, keep only one instance with maximal preference level in the list. Order generated mega-host 360 preference request list based on preference level. The high preference mega-host 360 will appear in the earlier place.
- For the cluster 312 preference request list, if a cluster 312 appears multiple times, keep only one instance with maximal preference level in the list. Order cluster preference request list based on preference level. The high preference cluster will appear in the earlier place.

At the end of the mapping phase, meta-scheduler 320 converts original host/cluster preference request lists into a mega-host 360 preference request list and a cluster 312 preference request list. During the mega-host 360/cluster 312 election phase, meta-scheduler 320 first removes all candidate mega-hosts 360 and clusters 312 that do not appear in the mega-host and cluster preference request lists. When comparing any two mega-hosts 360 or clusters 312, if mega-hosts 360 or clusters 312 have a different preference level, meta-scheduler 320 may select the mega-host 360 or cluster 312 with higher preference levels first based on the mega-host and cluster preference request list. If two mega-hosts 360 or clusters 312 have the equal preference level, meta-scheduler 320 may use other/additional job forwarding policies to select a particular mega-host 360/cluster 312.

Figure 7:
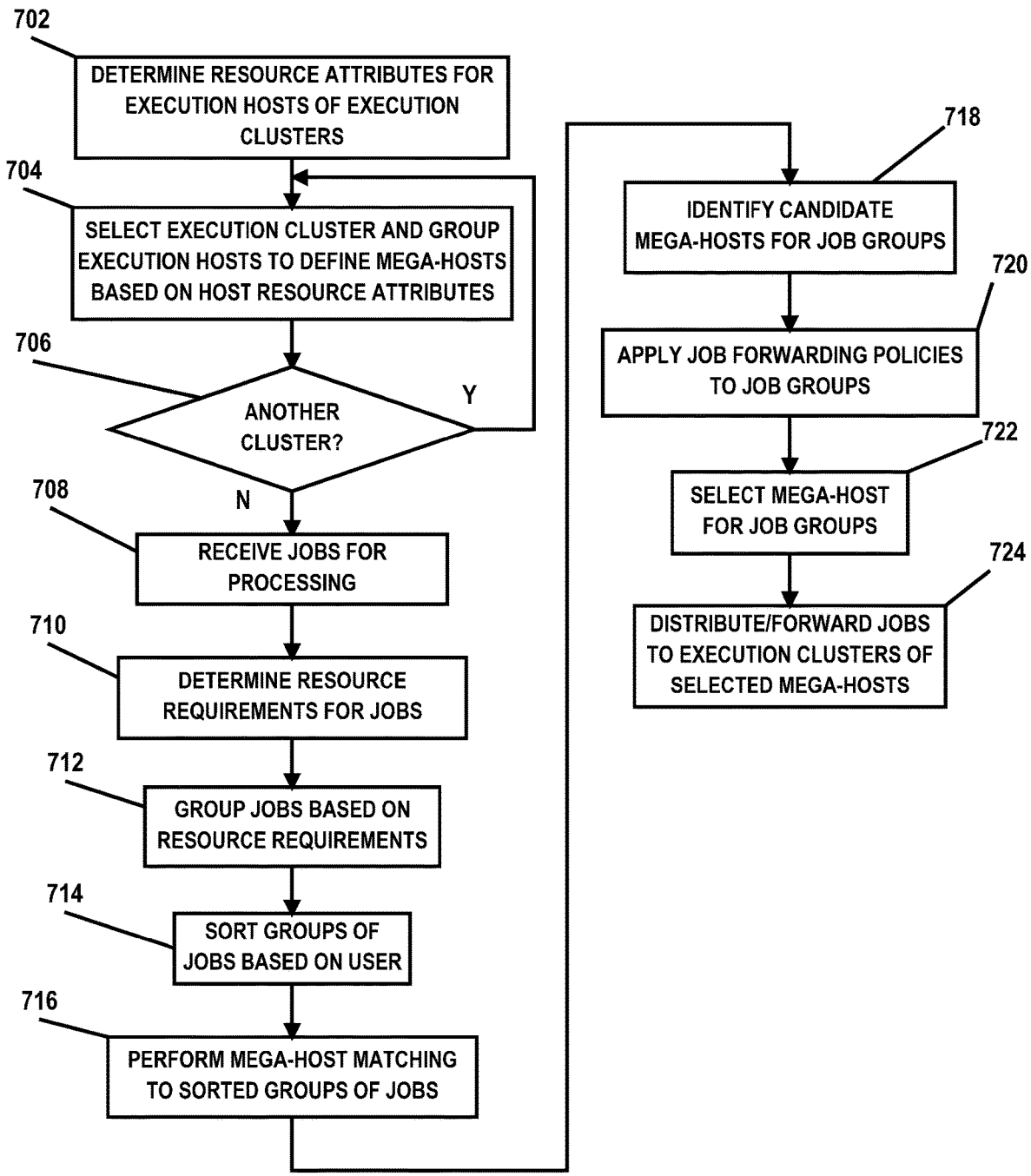
FIG. 7 is a flow diagram illustrating an embodiment of a method for job distribution within a grid environment according to the present disclosure.

FIG. 7 is a flow diagram illustrating an embodiment of a method for job distribution within a grid environment according to the present disclosure. The method begins at block 702, where meta-scheduler 320 determines resource attributes for execution hosts 344 of execution clusters 312. At block 704, meta-scheduler 320 selects one of the execution clusters 312 and groups execution hosts 344 having the same or similar resource attributes to define mega-hosts 360 based on the resource attributes of execution hosts 344. At decisional block 706, a determination is made whether there is another execution cluster 312 within grid environment 302. If so, the method proceeds to block 704 where meta-scheduler 320 continues to define mega-hosts 360 for each execution cluster 312. If at decisional block 706 is determined that no further execution clusters 312 require mega-host 360 definition, the method proceeds to block 708, where submission cluster 310 receives jobs 314 for processing.

At block 710, meta-scheduler 320 determines the resource requirements for the received jobs 314. At block 712, meta-scheduler 320 groups jobs 314 based on the resource requirements of the jobs 314 (e.g., grouping jobs having the same or similar resource requirements). At block 714, meta-scheduler 320 sorts the groups of jobs 314 based on the user's 316 submitting the jobs 314. At block 716, meta-scheduler 320 performs mega-host 360 matching to the sorted groups of jobs 314. At block 718, meta-scheduler 320 identifies candidate mega-hosts 360 for each of the groups of jobs 314. At block 720, meta-scheduler 320 applies one or more job forwarding policies to the groups of jobs (e.g., fair-share forwarding, host preference forwarding, etc.). At block 722, meta-scheduler 320 selects a particular mega-host 360 for a particular group of jobs 314 and/or individual jobs 314. At block 724, meta-scheduler 320 distributes and/or otherwise forwards jobs to execution clusters 312 based on the selection of corresponding mega-hosts 360.

Figure 8:
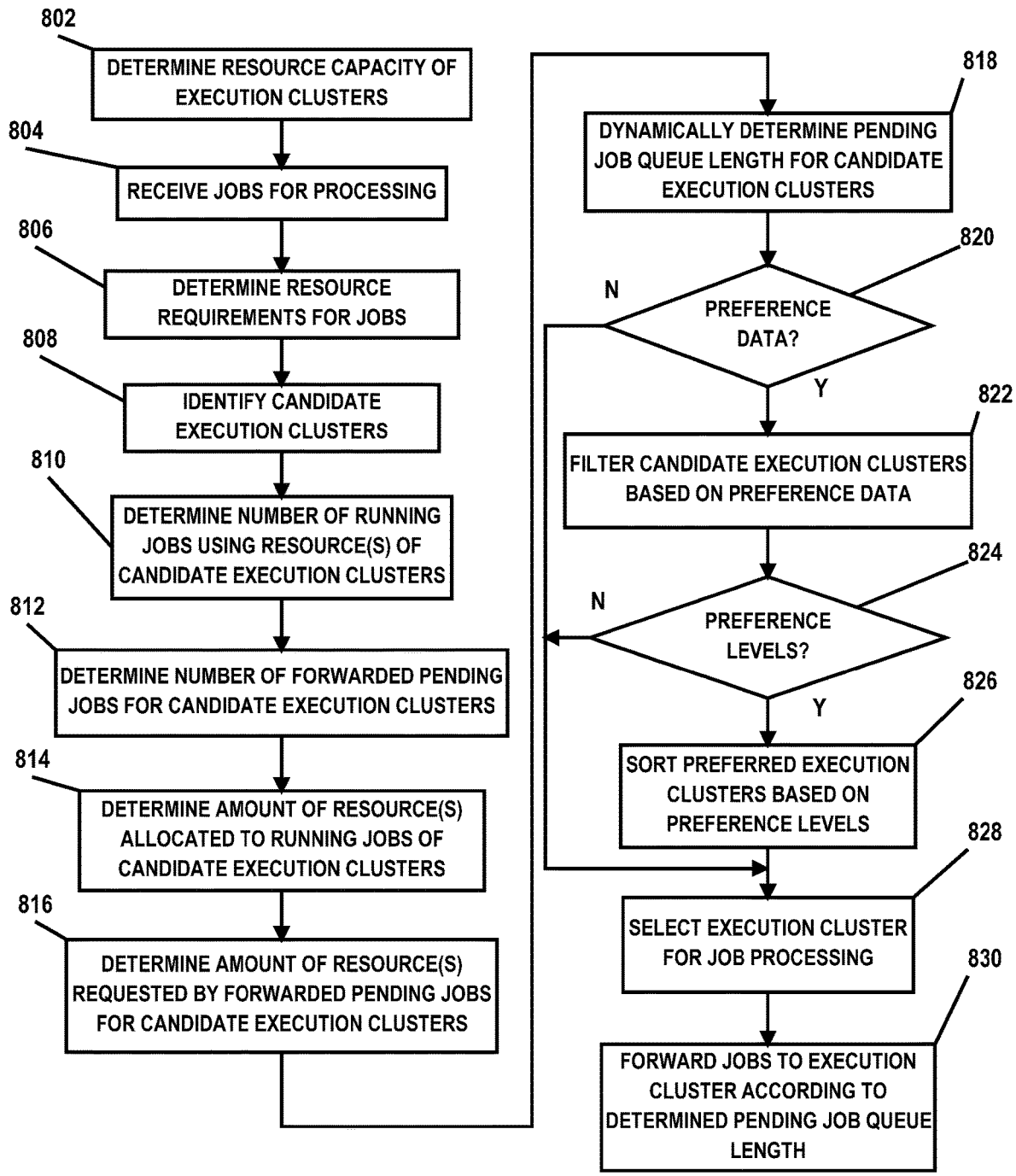
FIG. 8 is a flow diagram illustrating another embodiment of a method for job distribution within a grid environment according to the present disclosure.

FIG. 8 is a flow diagram illustrating another embodiment of a method for job distribution within a grid environment according to the present disclosure. The method begins at block 802, where meta-scheduler 320 determines the resource capacity of execution hosts 344 of execution clusters 312 (e.g., by defining mega-host 360 resource definitions corresponding to the execution hosts 344 of each execution cluster 312). At block 804, submission cluster 310 receives jobs 314. At block 806, meta-scheduler 320 determines the resource requirements for the received jobs 314. At block 808, meta-scheduler 320 identifies candidate execution clusters 312 (or mega-hosts 360) for running and/or processing the submitted jobs 314. At block 810, meta-scheduler 320 determines a number of running jobs 314 using resources of the identified candidate execution clusters 312. At block 812, meta-scheduler 320 determines a number of forwarded pending jobs 314 for the identified candidate execution clusters 312. At block 814, meta-scheduler 320 determines an amount of resources allocated to running jobs 314 of the identified candidate execution clusters 312. At block 816, meta-scheduler 320 determines that amount of resources requested by forwarded pending jobs 314 for the identified candidate execution clusters 312.

At block 818, meta-scheduler 320 dynamically determines a pending job queue length for the candidate execution cluster 312. At decisional block 820, meta-scheduler 320 determines whether the job resource requirements of the submitted jobs 314 include preference data 380. If not, the method proceeds to block 828. If the submitted jobs include preference data 380, the method proceeds from decisional block 820 to block 822, where meta-scheduler 320 filters the candidate execution clusters 312 (or mega-hosts 360) based on the indicated preference data 380. At decisional block 824, meta-scheduler 320 determines whether the preference data 380 includes preference levels. If not, the method proceeds to block 828. If the preference data 380 includes preference levels, the method proceeds from decisional block 824 to block 826, where meta-scheduler 320 sorts the preferred execution clusters 312 (or mega-hosts 360) based on the indicated preference levels. At block 828, meta-scheduler 320 identifies and/or otherwise selects an execution cluster 312 (or mega-host 360) for job processing. At block 830, meta-scheduler 320 forwards select jobs 314 to execution clusters 312 according to the determined pending job queue length for the corresponding execution host 344.

Thus, embodiments of the present disclosure provides a grid computing system that meets the performance requirements of large scale job processing by performing a course granularity matching process to submitted jobs (e.g., using mega-host 360 definitions) to quickly identify execution clusters 312 having the resources to satisfy the resource requirements of the submitted jobs (e.g., instead of analyzing the resources of each execution host). Embodiments of the present disclosure also provide scheduling efficiency by organizing jobs 314 into groups to enable meta-scheduler 320 to schedule groups of jobs 314 (e.g., instead of individual jobs). Embodiments of the present disclosure also provide a number of scheduling implementation for efficiently utilizing resources and scheduling jobs for back-end execution cluster 312 processing. For example, by utilizing fair-share policies regarding resource utilization (including a dynamic priority for users/user groups), a dynamic pending job queue length for execution clusters 312, a forwarding resource ratio for various resources of the execution clusters 312 (which may be applied on a resource-specific basis, applied to all resources of a particular type, applied to particular execution clusters 312, applied to all execution clusters 312, etc.) and/or a cluster 312 selection process that considers host-based resources and shared resources, including a weighting factor that may be applied to the various resources, to efficiently select the optimum execution cluster 312 for job processing.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for job distribution within a grid environment, comprising:
   receiving two or more jobs of a plurality of submitted jobs at a submission cluster for distribution of the two or more jobs to at least one of a plurality of execution clusters, each execution cluster having one or more execution hosts;
   determining resource requirements for each of the two or more jobs;
   determining resource attributes corresponding to each execution host of the execution cluster using a processor unit that evaluates computing resources of the execution hosts, wherein the computing resources are needed to execute the job according to the resource requirements;
   identifying candidate execution clusters for processing the two or more jobs based on:
   the existence of the computing resources of the execution hosts and the resource requirements of the job; and
   the availability of the computing resources of the execution hosts;
   selecting an optimum execution cluster from the candidate execution clusters for allocating each of the two or more jobs thereto for execution of the two or more jobs based on a weighting factor applied to select computing resources of the respective execution clusters, the weighting factor including a value assigned to the select computing resources representing an importance level of the select computing resources relative to other computing resources required for the job;

grouping the two or more jobs based on job resource requirements;

grouping, for each execution cluster, execution hosts based on the resource attributes of the respective execution hosts;

defining, for each grouping of execution hosts, a mega-host for the respective execution cluster, the mega-host for a respective execution cluster defining resource attributes based on the resource attributes of the respective grouped execution hosts;

creating a plurality of priority queues based on priorities of the grouped two or more jobs;

assigning each group of jobs to a corresponding priority queue; and identifying candidate mega-hosts for the submitted jobs based on the resource attributes of the respective mega-hosts and the resource requirements of the group of jobs.

2. The method of claim 1, further comprising grouping the execution hosts for a respective execution cluster based on select resource attributes for the respective execution hosts.

3. The method of claim 1, further comprising grouping the execution hosts for a respective execution cluster based on resource slots and memory capacity attributes for the respective execution hosts.

4. The method of claim 1, further comprising sorting the candidate execution clusters based on available resources of the respective candidate execution clusters.

5. The method of claim 1, further comprising applying a job forwarding policy for each of the two or more jobs based on a division of the resource attributes of the execution clusters among users requesting job processing.

6. The method of claim 1, further comprising:
determining a number of running jobs at the candidate execution clusters; and
determining a number of forwarded pending jobs at the candidate execution clusters forwarded from the submission cluster.

7. A system for job distribution within a grid environment, comprising:
a submission cluster, having a processor unit, for distributing two or more jobs of a plurality of jobs to at least one of a plurality of execution clusters, wherein each execution cluster comprises one or more execution hosts, and wherein the submission cluster comprises logic executable by the processor unit to:
determine resource requirements for the two or more jobs;
determine resource attributes corresponding to each execution host of the execution cluster using the processor unit that evaluates computing resources of the execution hosts, wherein the computing resources are needed to execute the two or more jobs according to the resource requirements;
identify candidate execution clusters for processing the two or more jobs based on:
the existence of the computing resources of the execution hosts and the resource requirements of the job; and
based on the existence of the computing resources of the execution hosts and the resource requirements of the job, the availability of the computing resources of the execution hosts; and
select an optimum execution cluster from the candidate execution clusters for allocating each of the two or more jobs thereto for execution of the two or more jobs based on a weighting factor applied to select computing resources of the respective execution clusters, the weighting factor including a value assigned to the select computing resources representing an importance level of the select computing resources relative to other computing resources required for the two or more jobs;

group the two or more jobs based on job resource requirements;

group, for each execution cluster, execution hosts based on the resource attributes of the respective execution hosts;

define, for each grouping of execution hosts, a mega-host for the respective execution cluster, the mega-host for a respective execution cluster defining resource attributes based on the resource attributes of the respective grouped execution hosts;

create a plurality of priority queues based on priorities of the grouped two or more jobs;

assign each group of jobs to a corresponding priority queue; and identify candidate mega-hosts for the submitted jobs based on the resource attributes of the respective mega-hosts and the resource requirements of the group of jobs.

8. The system of claim 7, wherein the logic is executable to group the execution hosts for a respective execution cluster based on select resource attributes for the respective execution hosts.

9. The system of claim 7, wherein the logic is executable to group the execution hosts for a respective execution cluster based on resource slots and memory capacity attributes for the respective execution hosts.

10. The system of claim 7, wherein the logic is executable to sort the candidate execution clusters based on available resources of the respective candidate execution clusters.

11. The system of claim 7, wherein the logic is executable to apply a job forwarding policy for each of the two or more jobs based on a division of the resource attributes of the execution clusters among users requesting job processing.

12. The system of claim 7, wherein the logic is executable to:
determine a number of running jobs at the candidate execution clusters; and
determine a number of forwarded pending jobs at the candidate execution clusters forwarded from the submission cluster.

13. A computer program product for job distribution within a grid environment, the computer program product comprising:
a non-transitory computer readable medium having computer readable program code embodied therewith, the computer readable program code comprising computer readable program code executable by a processor to:
determine resource requirements for a plurality of submitted jobs;
determine resource attributes corresponding to each execution host of a plurality of execution clusters using the processor unit that evaluates computing resources of the execution hosts, wherein the computing resources are needed to execute the jobs according to the resource requirements;
identify candidate execution clusters for processing each job of the plurality of submitted jobs based on:
the existence of the computing resources of the execution hosts and the resource requirements of each job; and
based on the existence of the computing resources of the execution hosts and the resource requirements of each job, the availability of the computing resources of the execution hosts; and select an optimum execution cluster from the candidate execution clusters for allocating each job thereto for execution of each job based on a weighting factor applied to select computing resources of the respective execution clusters, the weighting factor including a value assigned to the select computing resources representing an importance level of the select computing resources relative to other computing resources required for each job;

group two or more jobs of the plurality of jobs based on job resource requirements;

group, for each execution cluster, execution hosts based on the resource attributes of the respective execution hosts;

define, for each grouping of execution hosts, a mega-host for the respective execution cluster, the mega-host for a respective execution cluster defining resource attributes based on the resource attributes of the respective grouped execution hosts;

create a plurality of priority queues based on priorities of the grouped two or more jobs;

assign each group of jobs to a corresponding priority queue; and identify candidate mega-hosts for the submitted jobs based on the resource attributes of the respective mega-hosts and the resource requirements of the group of jobs.

14. The computer program product of claim 13, wherein the computer readable program code is configured to group the execution hosts for a respective execution cluster based on select resource attributes for the respective execution hosts.

15. The computer program product of claim 13, wherein the computer readable program code is configured to group the execution hosts for a respective execution cluster based on resource slots and memory capacity attributes for the respective execution hosts.

16. The computer program product of claim 13, wherein the computer readable program code is configured to sort the candidate execution clusters based on available resources of the respective candidate execution clusters.

17. The computer program product of claim 13, wherein the computer readable program code is configured to apply a job forwarding policy for each of the two or more jobs based on a division of processing attributes of the execution clusters among users requesting job processing.

18. The computer program product of claim 13, wherein the computer readable program code is configured to:
determine a number of running jobs at the candidate execution clusters; and
determine a number of forwarded pending jobs at the candidate execution clusters forwarded from the submission cluster.

* * * * *